(12) United States Patent
Coupart

(10) Patent No.: US 9,727,060 B2
(45) Date of Patent: Aug. 8, 2017

(54) SYSTEM FOR HOLDING AND DRIVING A SOLAR COLLECTOR AND METHOD FOR CONTROLLING IT

(71) Applicant: MOTEURS LEROY-SOMER, Angouleme (FR)

(72) Inventor: Eric Coupart, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 108 days.

(21) Appl. No.: 14/623,837

(22) Filed: Feb. 17, 2015

(65) Prior Publication Data

US 2015/0234389 A1 Aug. 20, 2015

(30) Foreign Application Priority Data

Feb. 17, 2014 (FR) ..................................... 14 51253

(51) Int. Cl.
| | |
|---|---|
| *F24J 2/38* | (2014.01) |
| *G05D 3/10* | (2006.01) |
| *F24J 2/40* | (2006.01) |
| *F24J 2/46* | (2006.01) |
| *F24J 2/54* | (2006.01) |
| *F24J 2/52* | (2006.01) |

(52) U.S. Cl.
CPC ............ *G05D 3/105* (2013.01); *F24J 2/405* (2013.01); *F24J 2/4638* (2013.01); *F24J 2/542* (2013.01); *F24J 2002/5298* (2013.01); *Y02E 10/47* (2013.01)

(58) Field of Classification Search
CPC .. F24J 2/14; F24J 2/405; F24J 2/5245–2/5258
USPC ........................................................ 126/600
See application file for complete search history.

(56) References Cited

U.S. PATENT DOCUMENTS

| | | | |
|---|---|---|---|
| 2009/0188488 A1* | 7/2009 | Kraft .......................... | F24J 2/38 126/601 |
| 2010/0252030 A1* | 10/2010 | Marcotte ................... | F24J 2/14 126/694 |

FOREIGN PATENT DOCUMENTS

| | | |
|---|---|---|
| EP | 2708831 A2 | 3/2014 |
| KR | 101207270 B1 | 12/2012 |
| WO | 2008/152342 A2 | 12/2008 |

OTHER PUBLICATIONS

Oct. 14, 2014 Written Opinion issued in French Application No. FR14 51253.

\* cited by examiner

*Primary Examiner* — Thanh Luu
(74) *Attorney, Agent, or Firm* — Oliff PLC

(57) ABSTRACT

Motorized system for holding and driving at least one solar energy collector, said system including: a supporting structure for the panel, movable at least in part in relation to the ground, so as to allow controlled displacement of the collector, notably about at least two axes of rotation, at least one blocking member, fixed in relation to the ground, at least one coupling member, movable with the collector and adapted to cooperate with the blocking element in at least one locking position of the collector, in order to hold the collector in the event of extreme winds, the coupling member being able to be moved into the locking position or locking positions as a result of a predefined movement of the collector, from a usual operating position where the coupling member is remote from the blocking member.

17 Claims, 2 Drawing Sheets

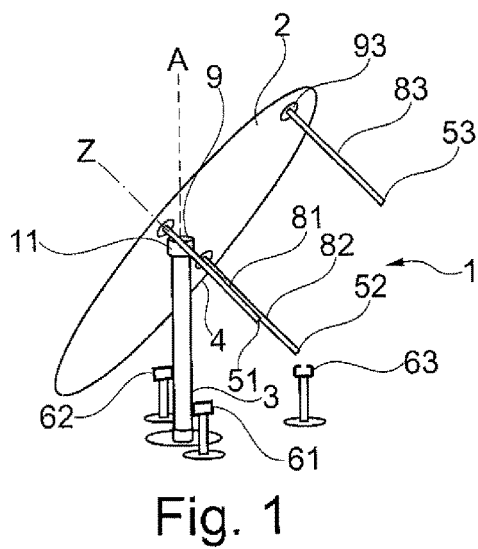
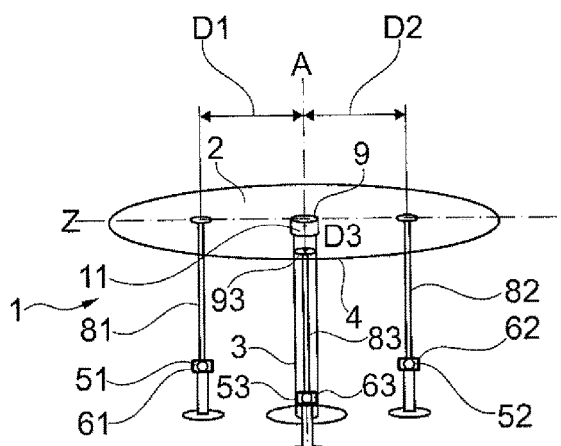
Fig. 1  Fig. 2
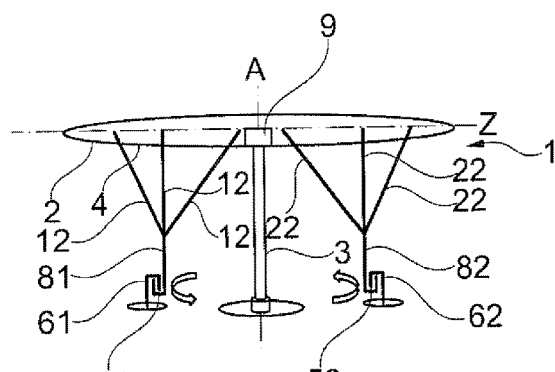
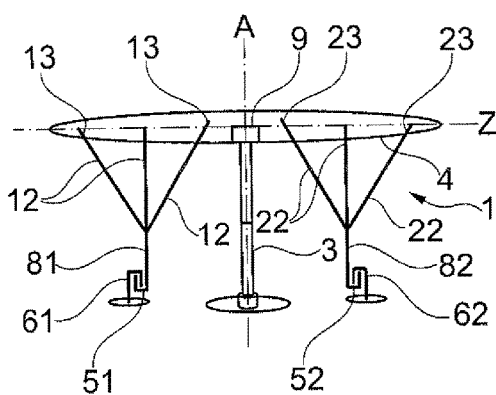
Fig. 3  Fig. 4
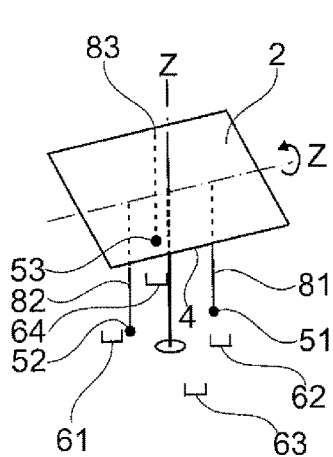
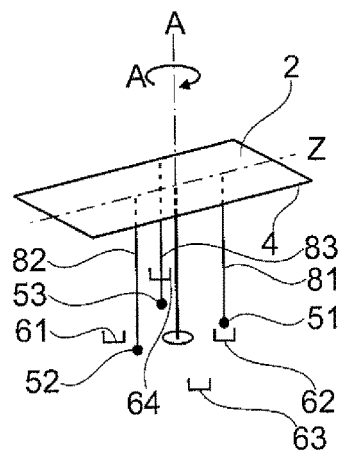
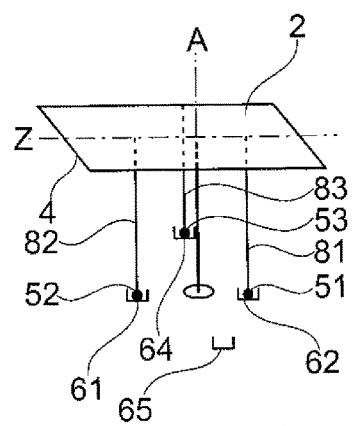
Fig. 5a  Fig. 5b  Fig. 5c

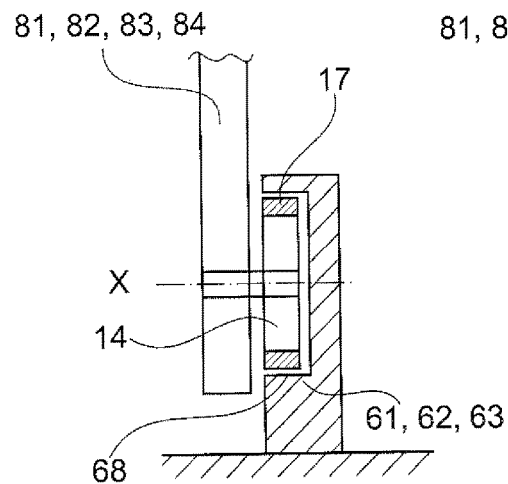
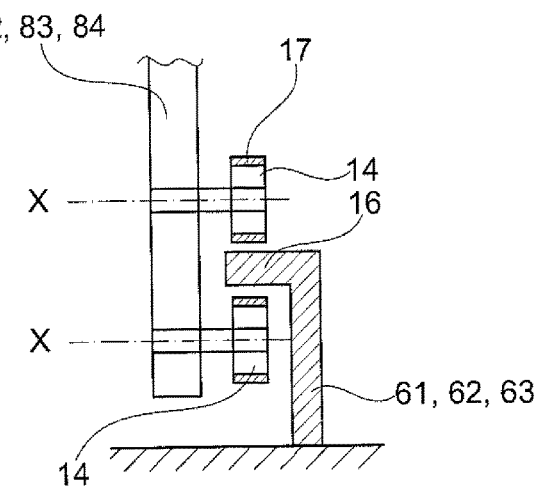
Fig. 6a                Fig. 6b
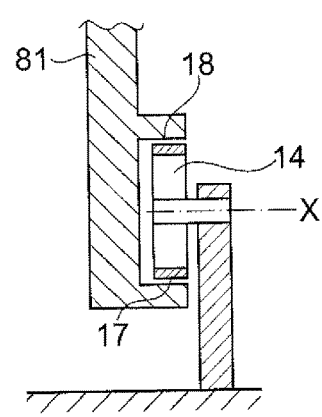
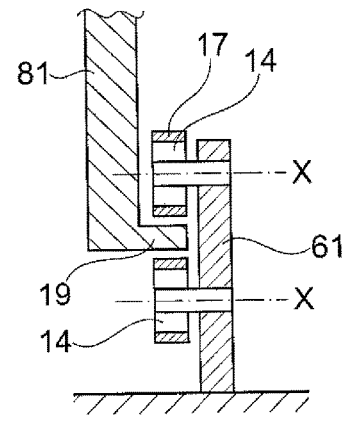
Fig. 7a                Fig. 7b

SYSTEM FOR HOLDING AND DRIVING A SOLAR COLLECTOR AND METHOD FOR CONTROLLING IT

The present invention concerns the protection of solar energy collector installations.

Thermal or photovoltaic installations for the concentrated harnessing of solar energy use precise orientation mechanisms to follow the path of the sun in the sky.

Said mechanisms, commonly called "trackers", generally allow for rotations about a zenithal axis and an azimuthal axis.

Actuators are used to drive the solar collectors about said axes, including rotary or linear electric motors, with direct drive or by means of mechanical transmissions with speed reduction.

When the installation is situated in a so-called cyclonic area where very violent winds may blow, the collectors, as a result of their large surface, are subject to extreme stresses.

Both the tracking mechanisms and the structures carrying the collectors are generally considerably over-dimensioned so as to be able to resist said meteorological conditions, which has an affect on the cost of the installations and may delay the setting up of the collectors in areas that are nevertheless very sunny.

To reinforce the strength of the collectors, a solution which is relatively onerous and complex to install consists in using a large diameter circular rail which allows for azimuthal rotation, is fixed to the ground at several points and by way of wheels supports an adjustable chassis, itself incorporating a mechanism for pivoting about a zenithal rotational axis.

Application WO 2008/152342 A2 describes a solution to protect a solar harnessing installation which consists in protecting the panel in a housing on the ground in the event of violent wind.

There is still a need to protect adjustable solar energy collectors in the event of violent winds in a manner that is reliable, simple and economic.

The object of the invention, therefore, according to one of its aspects, is a motorized system for holding and driving at least one solar energy collector, said system including:
- a supporting structure for the collector, movable at least in part in relation to the ground, so as to allow controlled displacement of the collector, notably about at least two axes of rotation,
- at least one blocking member, fixed in relation to the ground,
- at least one coupling member, movable with the collector and adapted to cooperate with the blocking element in at least one locking position of the collector, in order to hold the collector in the event of extreme winds,
- the coupling member being able to be moved into the locking position or locking positions as a result of a predefined movement of the collector, from a usual operating position, where the coupling member is remote from the blocking member.

The invention allows for efficient and reliable protection of the collectors against violent winds, is quick and economical to implement and is compatible with existing installations.

The invention allows the over-dimensioning of the supporting structures to be avoided and facilitates the setting up of collectors in sunny cyclonic regions.

The solar collector is constituted, for example, by one or several photovoltaic or thermal solar panels, mirrors, notably parabolic or flat mirrors, or lenses.

The supporting structure preferably includes a "tracker" type following mechanism with two axes, a zenith axis and an azimuth axis.

The supporting structure preferably includes a post, for example just one that is connected to the ground, the collector preferably being connected approximately in its centre to said post. The post is preferably vertical. Such a supporting structure is relatively economic and simple to implement. The rotation about the azimuthal axis may take place at the top of the post, or at its bottom.

The system may include several coupling members, for example at least two coupling members, preferably three coupling members.

When the holding system includes several blocking and coupling members, the locking of all the coupling members is preferably effected simultaneously, by a same movement of the collector.

The or each coupling member may be present on the end of a preferably non-extensible rod which is fixed to the rear of the collector and is displaced with said collector.

The rod is preferably oriented perpendicularly with respect to the ground when the collector is oriented in a horizontal position.

The coupling member and the blocking member are preferably locked in the locking position or locking positions as a result of simple cooperation of form, without any additional locking element. Thus, the locking may be obtained as a result of a predefined movement bringing the collector into the locking position, and the unlocking is effected by the reverse movement.

The blocking and/or coupling members include, for example, hooks.

When the blocking member is a hook close to the ground, during the movement of the collector into the locking position or locking positions, the coupling member present on the end of the aforesaid rod is coupled and blocked in said hook.

The or each coupling member may move into the locking position as a result of a movement which includes at least one step of pure azimuthal rotation and/or one step of pure zenithal rotation.

The coupling member is preferably arranged to move into the locking position following a movement which ends by a step of pure azimuthal rotation.

The azimuthal rotation may be from east to west or from west to east, as a function of the starting position of the collector, so as to minimize the path of the collector during said step of azimuthal rotation.

The zenithal axis is preferably oriented in a north-south direction in the locking position or locking positions so that the receiver is therefore situated in a horizontal position never used at dawn or dusk.

The movement of the collector leaving a locking position may be the reverse of that which brought it into said locking position.

So as to avoid any risk of jamming, the or each coupling system may include one or several wheels. As a variant to this or in addition to it, the or each blocking member may include one or several wheels. Said wheel or wheels may serve for the coupling and include a slightly deformable tyre.

The object of the invention is also a method for protecting an installation for harnessing solar energy with regard to extreme winds, said method including at least one collector and a supporting structure for the collector, at least movable in part in relation to the ground, so as to allow for controlled displacement of the collector,
the method in which the installation is provided with;

at least one blocking member fixed in relation to the ground, at least one coupling member, movable with the collector and adapted to cooperate with the blocking member in at least one locking position in order to hold the collector in the event of extreme winds, so as to obtain an installation according to the invention such as defined above.

The installation, which is provided with blocking and coupling members, may be an existing installation which is renovated or a new installation.

Another object of the invention, according to another of its aspects, is a method for controlling the movement of at least one collector of an installation which includes a system according to the invention in order to protect the collector with regard to extreme winds, the method including the step consisting in controlling the movement of the collector from a usual operating position so as to move the coupling member to engage in the blocking member.

For example, from a certain wind speed, generally between 60 and 100 km/h, information is transmitted to the holding system, which is controlled in order to move the collector from the position which it is occupying when receiving the information, into a locking position.

The collector is preferably initially moved into the horizontal position, for example as a result of a movement of pure zenithal rotation, and is then displaced into the locking position or one of the locking positions as a result of a movement of pure azimuthal rotation.

The trajectory taken by the collector to arrive at the locking position is never used during the normal operation of the collector in order to follow the sun.

The movements are preferably calculated, prior to controlling at least one drive motor, so as to minimize the path of the collector, notably azimuthal, for example by choosing between the direction of rotation east to west and west to east.

Effective cooperation between the blocking member and the coupling member can be detected in a locking position by measuring the load of at least one drive motor which ensures the displacement of the collector from its usual operating position into the locking position. On arrival in the locking position, the continuation of the movement may be prevented by the cooperation between the coupling member and the blocking member, and the supply current of the motor increases. Said increase may be detected and indicates the arrival in the locking position. The movement of the collector into the locking position may be effected, when it arises, at reduced speed on approaching the locking position so as to avoid putting too much of a strain on the structure if the coupling member abuts against the blocking member.

The path of the collector to bring it into a locking position may be calculated independently by a local calculating means.

The invention will be able to be better understood by reading the description below, the non-restricting examples of implementation of the same and by examining the accompanying drawing, in which:

FIG. 1 shows an exemplary embodiment of a holding and driving system according to the invention, in a usual operating position, FIG. 2 shows the system of FIG. 1 in a locking position, FIGS. 3 and 4 are views analogous to FIG. 1 of variants of embodiments of the system and FIGS. 5a to 5c show a trajectory of the system moving from a usual operating position into the locking position and FIGS. 6a-6b and 7a-7b show a partial schematic section of examples of coupling members and blocking members.

Solar collectors which include a "tracker" type following mechanism are usually used in installations for harnessing solar energy, such as a field of photovoltaic solar panels, a central unit with a tower heated by a flat mirror which reflects the incident rays of the sun or an installation which includes a parabolic mirror which allows the rays of the sun to be concentrated. The invention is applicable to all solar harnessing installations whether they be photovoltaic or thermal, preferably being concentrated.

FIGS. 1 and 2 show a holding and driving system 1 according to the invention, in a usual operating position and in a locking position respectively.

The system includes a solar collector 2 and a supporting structure 4 for the collector 2. The collector 2 is carried by the supporting structure 4 approximately in its centre 9 in the example considered.

The supporting structure 4 includes a central post 3 which bears a motorized driving mechanism 11 which allows the collector 2 to rotate about a first axis Z and a second axis A, both being perpendicular to one another. The axis Z is said to be zenithal and the axis A azimuthal, said latter being vertical in the example considered, mistaken for the longitudinal axis of the post 3.

As a variant to this, the post 3 may be movable in relation to the ground notably in allowing its rotation about the axis A. The driving mechanism 11, in this case, may allow just pivoting about the axis Z.

In the example shown in FIGS. 1 and 2, the system for holding the collector includes three coupling members 51, 52, 53 present respectively at the ends of three rods 81, 82, 83 which extend at the rear of the collector 2. The rods 81, 82, 83 are oriented approximately vertically in the locking position of the collector 2.

The longitudinal axes of the rods 81, 82 may intersect the axis Z.

In a holding system 1 which includes at least one rod 83, the longitudinal axis of which is offset from the axis Z, the coupling point 93 of said rod 83 is preferably situated in the top region of the collector 2 when said collector is in a position following the sun. This enables the risk of contact to be avoided between the coupling members 51, 52, 53 and the ground, which would be likely to impede the movement of the collector 2 during its normal operation following the sun.

In the locking position shown in FIG. 2, the coupling members 51, 52, 53 hold the collector 2 by cooperating with the corresponding blocking members 61, 62, 63, which are fixed relative to the ground and are anchored in said ground.

Compared to a normal operating position where the collector 2 is connected to the ground solely by means of the post 3 as shown in FIG. 1, there is therefore less risk of the collector 2 being carried away or damaged by the wind.

The spacings D1, D2 between the respective rods 81, 82 and the axis A are, for example, identical, and, for example, different from the spacing D3 between the rod 83 and the axis A, as shown in FIG. 2.

In the variants shown in FIGS. 3 and 4, the holding system 1 includes two coupling members 51, 52 which are present on the ends of the rods 81, 82 and two corresponding blocking members 61, 62 which are fixed to the ground.

In said variants, the rods 81, 82 are supported by the sets of three arms 12, 22, which connect them to the rear of the collector 2. The coupling members 51, 52 are thus displaced with the collector 2, when said latter follows the sun.

In a variant shown in FIG. 5, the longitudinal axes of the arms 12, 22 are coplanar with the axis Z.

In the variant shown in FIG. 6, the ends 13, 23 of the arms 12, 22 are remote from the axis Z, which allows the hold of the collector 2 to be strengthened.

The coupling members 51, 52, in the examples shown in FIGS. 3 and 4, may reach the locking position following a rotation in the direction from east to west or from west to east.

Any other configurations which use a larger or smaller number of arms 12, 22 and/or of rods 81, 82, or a different distribution of arms 12, 22 and/or of rods 81, 82 on the collector 2, do not depart from the framework of the present invention.

FIGS. 5a to 5c show the movement of a collector 2 from a normal operating position so as to arrive in a locking position.

The collector 2 may first of all be moved to a horizontal position as a result of rotating about the axis Z, as shown in FIG. 5b.

The collector 2 is then rotatingly driven about the axis A in order to arrive at the locking position where the coupling members 51, 52, 53 are locked for example on the respective blocking members 62, 61, 64, as shown in FIG. 5c.

In the case where the rods 81, 82 are situated on the axis Z at the same spacing in relation to the axis A, the rotation about the axis A may be effected in the direction east-west or west-east, as a function of the initial starting position of the collector, so as to minimize the azimuthal path of the collector 2 in order to arrive in the locking position.

The number of blocking members may be in excess of that for the coupling members, as shown in FIGS. 5a to 5c, in order to provide several locking positions, as a function, for example, of the location of the collector at the moment at which the holding system is controlled to move it into the locking position, or, as a variant, as a function of where the winds, against which efforts are made to protect the collector, are coming from.

As shown in FIGS. 5a to 5c, there may be two blocking members 63, 64, just one of which receives a corresponding coupling member 53, in the locking position, and two other blocking members 61, 62 which always receive a coupling member in the locking position.

The or each coupling member may include one or several wheels 14, with an axis/axes of rotation X which is/are perpendicular to the longitudinal axis of the rod 81, as shown in FIGS. 6a and 6b.

In the variant shown in FIG. 6a, the coupling member includes one single wheel 14, the blocking member 61, 62 or 63 having on one side a housing 68 in order to receive the wheel 14. Said latter is inserted into said housing 68 at the end of the azimuthal path of the collector in order to arrive at the locking position.

In the variant shown in FIG. 6b, the coupling member includes two wheels 14 with parallel axes, spaced along the longitudinal axis of the rod 81. The blocking member includes a stop 16 which engages between the wheels 14 in the locking position.

As a variant to this, one or several wheels 14, with horizontal axes of rotation X, may be carried by the or each blocking member, as shown in FIGS. 7a and 7b.

In the example shown in FIG. 7a, the blocking member includes one single wheel 14. The corresponding rod (81 to 84) has a housing 18 in which the wheel 14 may engage at the end of the azimuthal path of the collector.

In the variant shown in FIG. 7b, the blocking member 61 includes two wheels spaced vertically. The coupling member has a stop 19 at the end which engages between the wheels 14 in the locking position.

The wheel or wheels 14 may have a tyre 17, which may be elastically deformable.

Any other configuration using a larger or smaller number of wheels, carried by the coupling and/or blocking member, does not depart from the framework of the present invention.

The invention is not restricted to the exemplary embodiments shown.

For example, the solar collector may be supported by the supporting structure elsewhere other than in its centre.

The expression "including one" must be understood as being synonymous with "comprising at least one".

The invention claimed is:

1. Motorized system for holding and driving at least one solar energy collector, said system comprising:
    a supporting structure for the collector, movable at least in part in relation to the ground, so as to allow controlled displacement of the collector,
    at least one blocking member, fixed in relation to the ground,
    at least one coupling member, movable with the collector and adapted to cooperate with the blocking element in at least one locking position of the collector, in order to hold the collector in the event of extreme winds,
    the coupling member(s) being able to be moved into the locking position or locking positions as a result of a predefined movement of the collector, from a usual operating position where the coupling member(s) are remote from the blocking member(s), the coupling member being arranged to move into the locking position following a movement which ends by a step of pure azimuthal rotation.

2. System according to claim 1, the or each coupling member being present on the end of a rod which is fixed at the rear of the collector and being displaced with said collector.

3. System according to claim 1, said system comprising several coupling members.

4. System according to claim 1, the or each coupling member moving into the locking position as a result of a movement which comprises at least one step of pure azimuthal rotation and/or one step of pure zenithal rotation.

5. System according to claim 1, the or each coupling member comprising one or several wheels which serve for the coupling.

6. System according to claim 1, the or each blocking member comprising one or several wheels which serve for the coupling.

7. System according to claim 1, the number of blocking member(s) being in excess of the number of coupling member(s).

8. System according to claim 1, the supporting structure comprising a post.

9. System according to claim 8, the collector being connected approximately in its center to said post.

10. Method for protecting an installation for harnessing solar energy with regard to extreme winds, said installation comprising at least one solar energy collector and a supporting structure for the collector, at least movable in part in relation to the ground, so as to allow for controlled displacement of the collector,
    said method comprising providing the installation with
        at least one blocking member fixed in relation to the ground, at least one coupling member, movable with the collector and adapted to cooperate with the blocking member in at least one locking position, in order to hold the collector in the event of extreme winds, so as to obtain an installation which comprises a system according to claim 1.

11. Method for controlling the movement of a solar energy collector of an installation which comprises a system as defined in claim 1, in order to protect the collector with regard to extreme winds, said method comprising the step of controlling the movement of the collector from a usual operating position so as to move the coupling member(s) to engage with the blocking member(s).

12. Method according to claim 11, the collector first of all being moved into a horizontal position then displaced into its locking position as a result of a movement of pure azimuthal rotation.

13. Method according to claim 12, the movements of the collector being calculated prior to the control of at least one drive motor so as to minimize the path, notably azimuthal, of the collector.

14. Method according to claim 11, the movement of the collector leaving a locking position being the reverse of that which moved it into said locking position.

15. Method according to claim 11, the path of the collector to move it into a locking position being calculated in an independent manner by a local calculating means.

16. Motorized system for holding and driving at least one solar energy collector, said system comprising:

a supporting structure for the collector, movable at least in part in relation to the ground, so as to allow controlled displacement of the collector, at least one blocking member, fixed in relation to the ground, at least one coupling member, movable with the collector and adapted to cooperate with the blocking element in at least one locking position of the collector, in order to hold the collector in the event of extreme winds, the coupling member(s) being able to be moved into the locking position or locking positions as a result of a predefined movement of the collector, from a usual operating position where the coupling member(s) are remote from the blocking member(s), the coupling member(s) and the blocking member(s) being locked in the locking position or locking positions, as a result of a simple cooperation of forms, without any additional locking element, the number of blocking member(s) being in excess of the number of coupling member(s).

17. Method for controlling the movement of a solar energy collector of an installation which comprises a motorized system for holding and driving at least one solar energy collector, said system comprising:

a supporting structure for the collector, movable at least in part in relation to the ground, so as to allow controlled displacement of the collector about at least two axes of rotation, at least one blocking member, fixed in relation to the ground, at least one coupling member, movable with the collector and adapted to cooperate with the blocking element in at least one locking position of the collector, in order to hold the collector in the event of extreme winds, the coupling member(s) being able to be moved into the locking position or locking positions as a result of a predefined movement of the collector, from a usual operating position where the coupling member(s) are remote from the blocking member(s), said method comprising detecting effective cooperation between the blocking member and the coupling member in a locking position by measuring the load of at least one drive motor which ensures the displacement of the collector from its usual operating position into the locking position.

\* \* \* \* \*